United States Patent
Liu et al.

(10) Patent No.: US 11,674,796 B2
(45) Date of Patent: Jun. 13, 2023

(54) SYSTEMS AND METHODS FOR IDENTIFYING AND MITIGATING GAS TURBINE COMPONENT MISALIGNMENT USING VIRTUAL SIMULATION

(71) Applicant: General Electric Company, Schenectady, NY (US)

(72) Inventors: Shan Liu, Greenville, SC (US); Carrie L. Grimard, Greenville, SC (US); Jacob A. Salm, Greenville, SC (US); Serhat Yumusak, Kocaeli (TR); Richard Bowles, Greenville, SC (US); Marina Karr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 296 days.

(21) Appl. No.: 16/841,277

(22) Filed: Apr. 6, 2020

(65) Prior Publication Data
US 2021/0310801 A1    Oct. 7, 2021

(51) Int. Cl.
*F01D 9/02*    (2006.01)
*F02C 7/00*    (2006.01)
(Continued)

(52) U.S. Cl.
CPC ............... *G01B 11/27* (2013.01); *F01D 9/02* (2013.01); *F02C 7/00* (2013.01); *G01B 11/005* (2013.01); *F05D 2260/80* (2013.01)

(58) Field of Classification Search
CPC ............. F05D 2240/10; F05D 2240/11; F05D 2240/12; F05D 2240/128; F05D 2240/40;
(Continued)

(56) References Cited

U.S. PATENT DOCUMENTS 7,090,464 B2 *   8/2006  Henning ............... F01D 5/3007
                                                   29/889.22
7,114,920 B2 *  10/2006  Synnott .................... F01D 9/02
                                                   415/173.1

(Continued)

OTHER PUBLICATIONS

Extended Search Report for EP 21163567.7-1004, dated Jul. 27, 2021 (8 pp ).

*Primary Examiner* — Richard A Edgar
*Assistant Examiner* — Michael K. Reitz
(74) *Attorney, Agent, or Firm* — Eversheds Sutherland (US) LLP (57) ABSTRACT

Systems and methods for identifying and mitigating gas turbine component misalignment using virtual simulation are disclosed herein. An example method may include capturing data associated with a first nozzle segment and a second nozzle segment of a gas turbine. The method may also include creating, based on the captured data, a virtual representation of the first nozzle segment and the second nozzle segment. The method may also include determining that a misalignment exists in a connection between the virtual representation first nozzle segment and the virtual representation of the second nozzle segment. The method may also include identifying, based on the determination that the misalignment exists, a third nozzle segment. The method may also include determining that a connection between a third nozzle segment and the first nozzle segment includes a smaller misalignment.

17 Claims, 8 Drawing Sheets

(51) Int. Cl.
  *G01B 11/27* (2006.01)
  *G01B 11/00* (2006.01)
(58) Field of Classification Search
  CPC ............. F05D 2240/80; F05D 2240/90; F05D 2240/91; F05D 2230/50; F05D 2230/60; F05D 2230/64; F05D 2230/72; F05D 2260/80; F05D 2260/81; F05D 2260/82; F05D 2240/57; F05D 2260/83; F05D 2230/80; G01B 11/27; G06F 30/20; F01D 9/02; F01D 11/005; F01D 9/042; F02C 7/00
  See application file for complete search history.

(56) References Cited

U.S. PATENT DOCUMENTS

| | | | |
|---|---|---|---|
| 8,140,308 B2* | 3/2012 | Menuey | F01D 9/041 703/7 |
| 10,202,859 B2* | 2/2019 | Biemar | F01D 9/042 |
| 2002/0128790 A1 | 9/2002 | Woodmansee | |
| 2007/0297900 A1* | 12/2007 | Abgrall | F01D 9/041 415/209.3 |
| 2009/0106130 A1* | 4/2009 | Quinn | G06Q 10/087 705/28 |
| 2013/0113913 A1 | 5/2013 | Scheid et al. | |

\* cited by examiner

SYSTEMS AND METHODS FOR IDENTIFYING AND MITIGATING GAS TURBINE COMPONENT MISALIGNMENT USING VIRTUAL SIMULATION

TECHNICAL FIELD

Embodiments of the present disclosure may relate generally to gas turbine engines and more particularly relate to systems and methods for determining optimal alignment of components in a gas turbine.

BACKGROUND

Current practice for nozzle fit checks in gas turbines may involve building a physical shroud simulator to simulate the nozzle assembly (seals, nozzle inter-segment spacing, hooks with the shroud dimensions and tolerances, etc.) and engine run condition. The physical simulator may have a large footprint and may be heavy. An example physical simulator may occupy a floor area of 60" (L)×50" (W) and weigh 1700 lbs. Additionally, sliding heavy nozzles through the fixture frequently proves to be labor intensive and difficult, especially aligning seals with seal slots in side walls.

SUMMARY

In some embodiments, a method may be provided. The method may include capturing data associated with a first nozzle segment and a second nozzle segment of a gas turbine. The method may also include creating, based on the captured data, a virtual representation of the first nozzle segment and the second nozzle segment. The method may also include determining that a misalignment exists in a connection between the virtual representation of the first nozzle segment and the virtual representation of the second nozzle segment. The method may also include identifying, based on the determination that the misalignment exists, a third nozzle segment. The method may also include determining that a connection between a third nozzle segment and the first nozzle segment includes a smaller misalignment.

In some embodiments, a system may be provided. The system may include a processor and a memory storing computer-executable instructions, that when executed by the processor, cause the processor to capture data associated with a first nozzle segment and a second nozzle segment of a gas turbine. The computer-executable instructions may also cause the processor to create, based on the captured data, a virtual representation of the first nozzle segment and the second nozzle segment. The computer-executable instructions may also cause the processor to determine that a misalignment exists in a connection between the virtual representation of the first nozzle segment and the virtual representation of the second nozzle segment. The computer-executable instructions may also cause the processor to identify, based on the determination that the misalignment exists, a third nozzle segment of the same configuration as the second nozzle. The computer-executable instructions may also cause the processor to determine that a connection between a third nozzle segment and the first nozzle segment includes a smaller misalignment.

In some embodiments, a non-transitory computer-readable medium may be provided. The computer-readable medium may store computer-executable instructions which, when executed by one or more processors, result in performing operations comprising capturing data associated with a first nozzle segment and a second nozzle segment of a gas turbine. The operations may also include creating, based on the captured data, a virtual representation of the first nozzle segment and the second nozzle segment. The operations may also include determining that a misalignment exists in a connection between the virtual representation of the first nozzle segment and the virtual representation of the second nozzle segment. The operations may also include identifying, based on the determination that the misalignment exists, a third nozzle segment of the same configuration as the second nozzle. The operations may also include determining that a connection between a third nozzle segment and the first nozzle segment includes a smaller misalignment.

BRIEF DESCRIPTION OF THE DRAWINGS

Reference will now be made to the accompanying drawings, which are not necessarily drawn to scale.

DETAILED DESCRIPTION

Illustrative embodiments will now be described more fully hereinafter with reference to the accompanying drawings, in which some, but not all embodiments are shown. The present disclosure may be embodied in many different forms and should not be construed as limited to the embodiments set forth herein. Like numbers refer to like elements throughout.

Illustrative embodiments are directed to, among other things, systems and methods for identifying and mitigating gas turbine component misalignment using virtual simulation. Such misalignment may include a suboptimal connection between the components and may result from a physical deformity in one or more of the components. In some instances, the components may include nozzles of a gas turbine. However, the systems and methods described herein may similarly be applied to any other types of components that may experience a misalignment due to structural deformities, even including components outside of the gas turbine context. Conventional methods for inspecting an assembly in a gas turbine may involve an operator removing individual components and performing a visual inspection of the removed components. In some instances, the components may also be inserted to a physical test fixture. Additionally, under some conventional methods, if the operator is to discover a physical deformity of the mating features in an inspected component, the component may be required to be physically reworked or repaired until the deformity is removed or mitigated. In some instances, the deformity may involve a deformity in a seal slot of the nozzle, such that the nozzle may not be able to form a proper connection with an adjacent nozzle in the gas turbine, however other deformities are also possible. The systems and methods described herein may improve upon these conventional methods by using virtual simulation methods to identify nozzle misalignments, and additionally by using these methods to identify potential rearrangements of nozzles that would result in more proper connections and remove the need to physically rework or repair a deformed nozzle. More specifically, the virtual simulation may involve scanning the nozzles to create a corresponding simulation of the components, identifying any deformities through the simulation, and using an algorithm (for example, this algorithm may be described in more detail with respect to FIGS. 4-5 below) to determine if a nozzle including the deformity may be swapped with a similar component (e.g., a similar nozzle in the gas turbine). This may serve to mitigate the impact of the deformity and still allow the component to function without an operator having to physically rework the component. Additionally, while the systems and methods described herein may be described specifically with respect to nozzle seals, the systems and methods could similarly apply to any other interface between two nozzles or any other components of a gas turbine or general ring-like structure including interchangeable elements.

Figure 1:
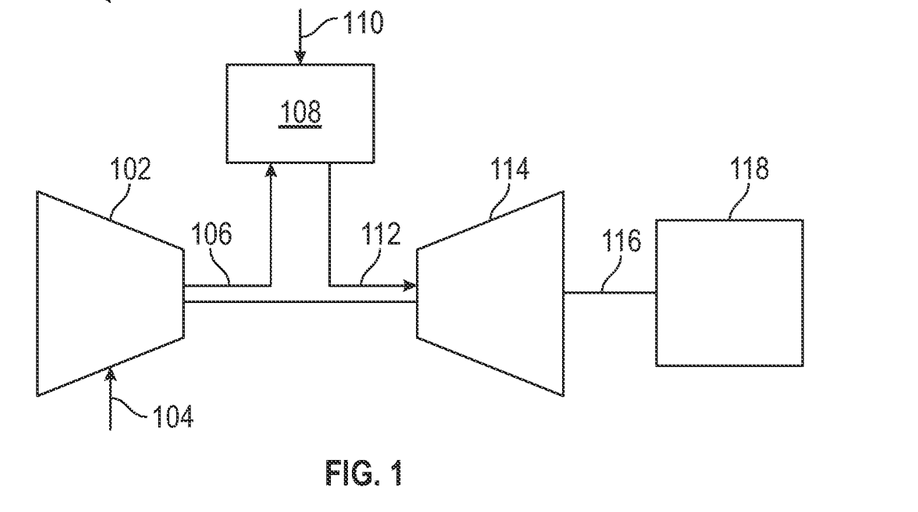
FIG. 1 schematically depicts an example gas turbine engine according to an embodiment.

With respect to the figures, FIG. 1 depicts an example schematic view of a gas turbine engine 100 as may be used herein. The gas turbine engine 100 may include a compressor 102. The compressor 102 may compress an incoming flow of air 104. The compressor 102 may deliver the compressed flow of air 106 to a combustor 108. The combustor 108 may mix the compressed flow of air 106 with a pressurized flow of fuel 110 and ignite the mixture to create a flow of combustion gases 112. Although only a single combustor 108 is shown, the gas turbine engine 100 may include any number of combustors 108. The flow of combustion gases 112 may be delivered to a turbine 114. The flow of combustion gases 112 may drive the turbine 114 so as to produce mechanical work. The mechanical work produced in the turbine 114 may drive the compressor 102 via a shaft 116 and an external load 118, such as an electrical generator or the like.

The gas turbine engine 100 may use natural gas, various types of syngas, and/or other types of fuels. The gas turbine engine 100 may be any one of a number of different gas turbine engines offered by General Electric Company of Schenectady, N.Y., including, but not limited to, those such as a 7 or a 9 series heavy duty gas turbine engine and the like. The gas turbine engine 100 may have different configurations and may use other types of components. The gas turbine engine may be an aeroderivative gas turbine, an industrial gas turbine, or a reciprocating engine. Other types of gas turbine engines also may be used herein. Multiple gas turbine engines, other types of turbines, and other types of power generation equipment also may be used herein together.

Figure 2:
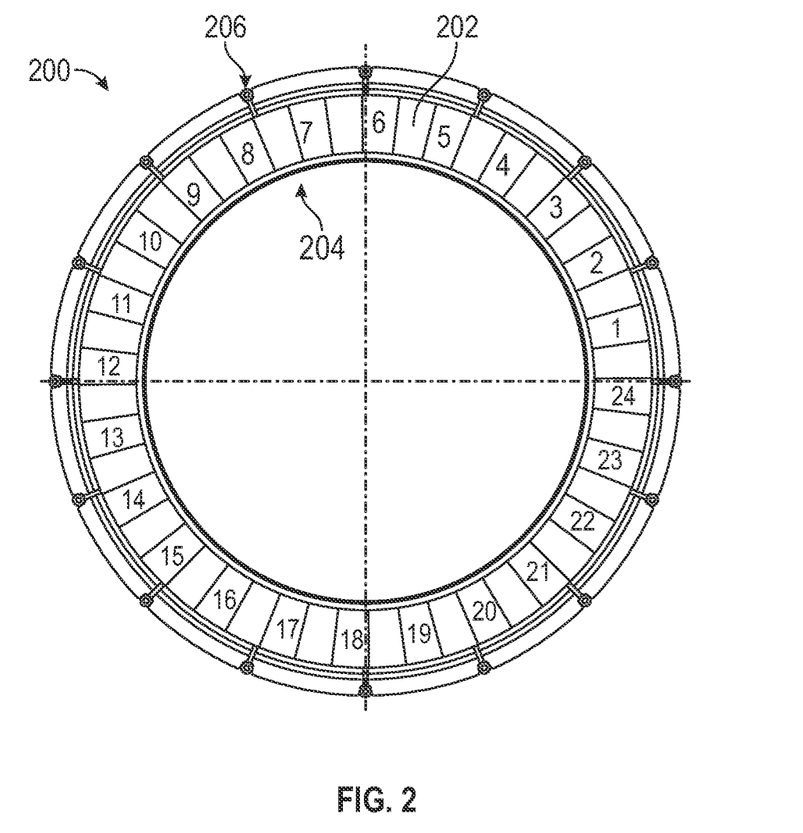
FIG. 2 schematically depicts a view of an assembly of gas turbine nozzles connected in a ring-like formation according to an embodiment.
Figure 3A:
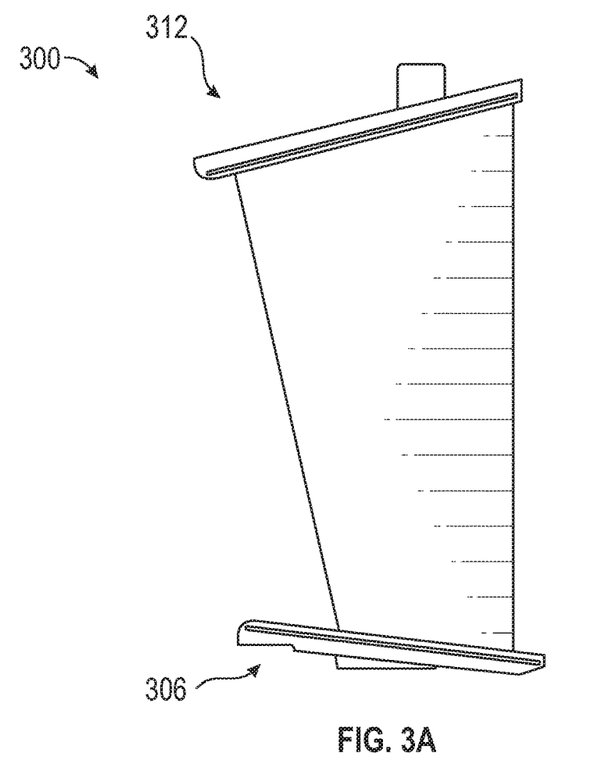
FIG. 3A schematically depicts an example of an individual nozzle of a gas turbine according to an embodiment.

FIG. 2 depicts an example of a ring-shaped assembly 200, which, in some embodiments, may represent a turbine nozzle ring structure in a gas turbine. In some embodiments, such a structure may often includes one or more nozzles 202 (a depiction of an individual nozzle 300 may be found in FIG. 3A). A nozzle 202 may include an inner diameter 204 and an outer diameter 206 (which may also be shown as 306 and 312 respectively in FIG. 3A). The nozzles 202 may removably attach to one another to form the turbine inlet nozzle vane in the ring-shaped arrangement depicted in FIG. 2. The nozzles 202 may be removably attached to one another using one or more seals (not depicted in FIG. 2, but may be shown with respect to FIGS. 3B-3C below) between adjacent nozzles 202. Additionally, individual nozzles 202 may be associated with one or more different nozzle configurations. A nozzle configuration may refer to a particular structural design of the nozzle, such that different configurations may include differing structural features and similar configurations may include similar structural features. For example, a first nozzle and a second nozzle may be of a first configuration, and a third nozzle, fourth nozzle, and fifth nozzle may be of a second configuration. The differences in nozzle configurations may result in only nozzles 202 of the same or a similar configuration being swappable (for example, as may be performed through the operations/steps described below with respect to FIGS. 4-6). That is, in the example provided above, the first nozzle may be swappable with the second nozzle, but may not be swappable with the third nozzle. In some instances, however, all of the nozzles 202 may be of the same configuration and/or any nozzle 202 of any configuration may be swappable with any other nozzle 202. Although the systems and methods described herein may pertain to nozzles of a gas turbine, the systems and methods may also be applied to any other ring-like structure including interchangeable elements.

Figure 3B:
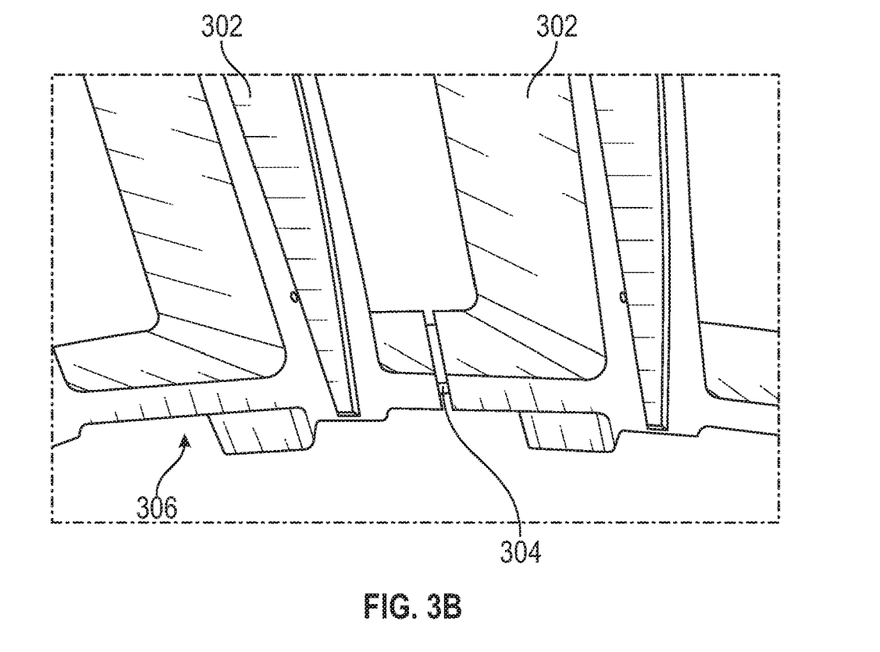
FIG. 3B schematically depicts an example of a connection between two nozzles of a gas turbine according to an embodiment.
Figure 3C:
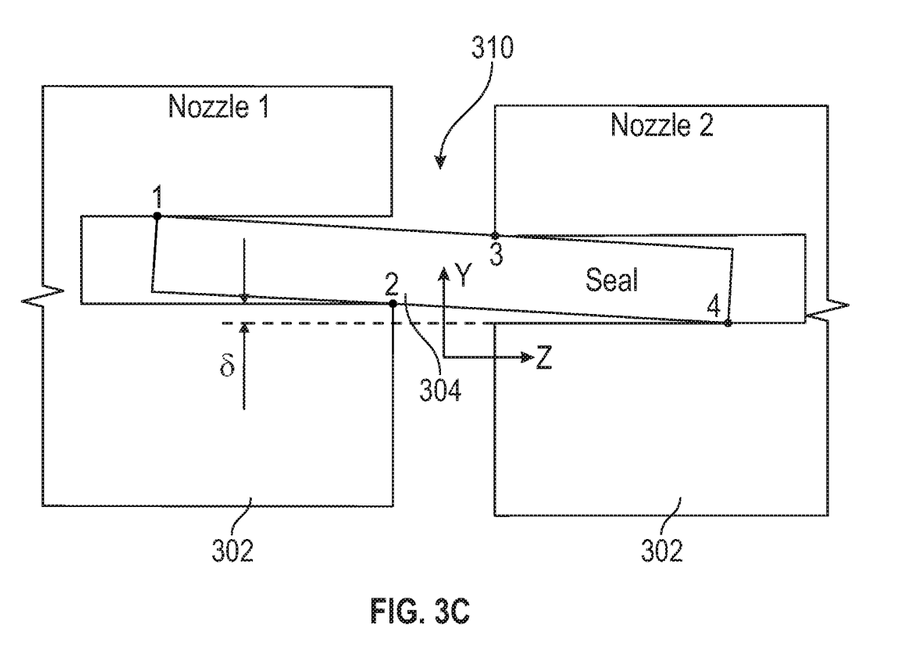
FIG. 3C schematically depicts an example seal misalignment between two nozzles of a gas turbine according to an embodiment.

FIGS. 3B and 3C depict an example of a connection between two adjacent nozzles 302. In some embodiments, the nozzles 302 may be the same as the nozzle 202 described with reference to FIG. 2 and/or the nozzle 300 described with reference to FIG. 3A (as well as any other nozzles described herein). The nozzles 302 may represent two of a number of additional nozzles not depicted in FIGS. 3B and 3C, where the combination of the two depicted nozzles 302 and the remainder of the undepicted nozzles may form a ring-like structure similar to the one depicted in FIG. 2. In some instances, the nozzles 302 may be removably connected using a seal 304, which may be located at an inner diameter 306 of the nozzles 302. However, in alternative embodiments, the seal 304 may be located at the outer diameter (not shown in the figure) of the nozzles 302, or any other portion of the nozzles 302. In some embodiments, multiple seals 304 may be present at different locations on the nozzles 302. Additionally, FIG. 3C may also depict a suboptimal connection 310 between the nozzles 302. The suboptimal connection 310 may include a misalignment, δ, between the two nozzles 302. The suboptimal connection 310 may be the result of a number of factors, such as a deformation in the seal 304 and/or a deformation in either one or both of the nozzles 302.

Figure 4:
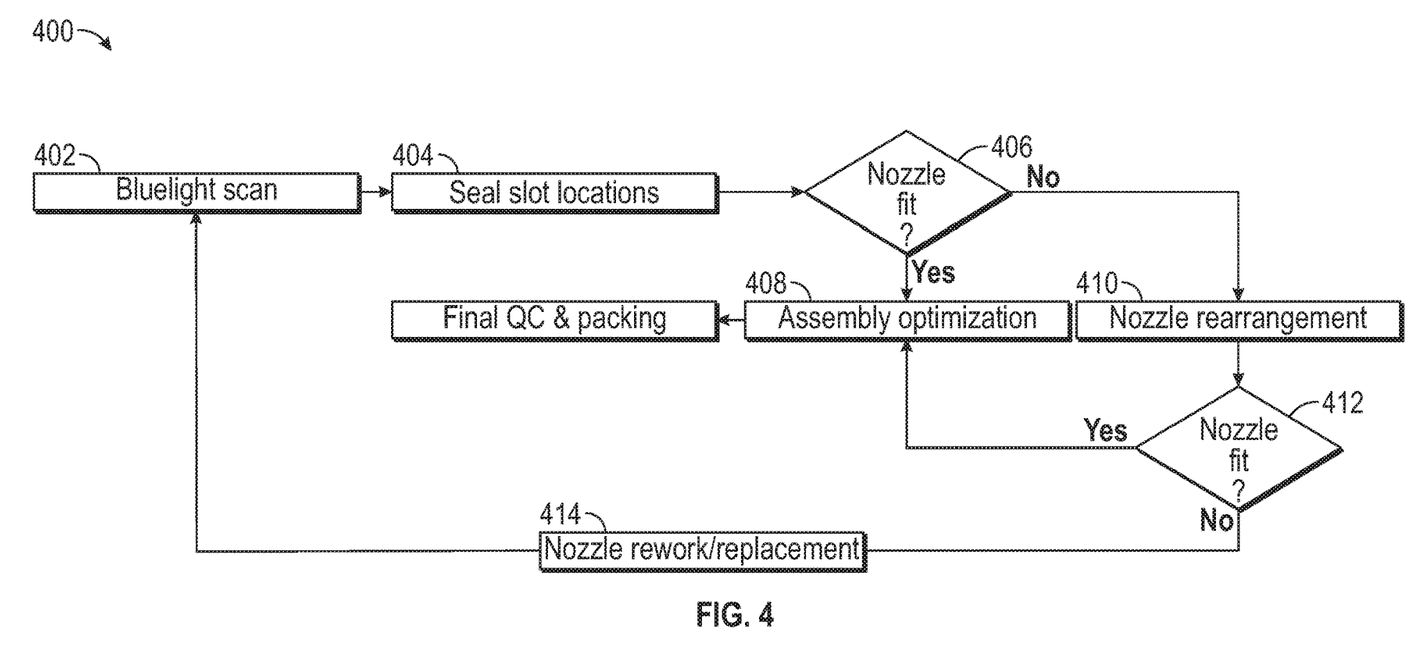
FIG. 4 depicts an example process flow according to an embodiment.

FIG. 4 depicts an example process flow 400 according to an embodiment. In some embodiments, the example process flow 400 may be used to identify non-conforming connections between nozzles (for example, as depicted in FIG. 3C above), and may also be used to determine whether the nozzles with associated non-conforming connections may be swapped with other nozzles of similar configurations to produce more conforming connections. A non-conforming connection may refer to a connection between two nozzles in which a misalignment between the two nozzles is larger than a threshold value. The misalignment beyond the threshold value may result in an inability to slide a seal into a pair of facing seal slots on the two nozzles. That is, the connection between the two nozzles may not be able to receive a seal, and thus may be unsealable. Thus, the process flow 400 may allow for non-conforming connections between nozzles of a gas turbine to be remedied without an operator having to remove and physically rework or repair a nozzle to better align with an adjacent nozzle.

In some embodiments, the process flow 400 may begin at 402 with a scan being performed on one or more nozzles that are included in the gas turbine. In some embodiments, the scan may include a bluelight scan, which may be a particular type of 3D scan. In some embodiments, a coordinate-measuring machine (CMM) may also be used. In other embodiments, however, the scan can include any other type of 3D scan. Once the scanning of the nozzles is complete, virtual representations of the nozzles may be formed using simulation software, which may include, for example, the component misalignment identification and mitigation module 714 described with respect to FIG. 7 below. The virtual representations may be 3D virtual representations. In some embodiments, at 404, information may be provided that may indicate the location of the scanned nozzles with respect to one another, such that the full ring-structure may be formed from the virtual representations of the nozzles. The ring-structure may include a virtual representation of the location of the nozzles as they would exist in the physical gas turbine. At 406, the simulation software may determine if any non-conforming connections exist between the virtual representations of the nozzles. For example, such non-conforming connections may be similar to the one depicted with respect to FIG. 3C above. In some instances, it may be determined that all of the virtual representations of the nozzles are connect together through conforming but suboptimal connections (suboptimal connections may be defined below with respect to FIG. 5). A conforming connection may be a connection in which the misalignment between two nozzles is less than the threshold value, such that the seal may slide into the pair of facing seal slots in the two nozzles. In such instances, at 408, assembly optimization may be performed (for example, as described with reference to FIG. 5 below) and a final quality check and packaging of the physical nozzles may be undertaken. In some instances, the nozzles may already be in a conforming and optimal arrangement. In such instances, rearrangements of the nozzles may not be required.

However, in other instances, it may be determined that one or more of the connections between nozzles are non-conforming. In such instances, at 410, it may be determined if nozzle rearrangements can be performed to eliminate or mitigate the non-conforming connections. Such rearrangement determinations may involve identifying if nozzles of similar configuration to the nozzles with non-conforming connection may swap locations to result in conforming connections. As an example scenario, a first nozzle and a second nozzle may have a non-conforming connection. A third nozzle may be of the same configuration as the second nozzle, and it may be determined that moving the third nozzle to the location of the second nozzle may result in a conforming connection. This may be because the deformation of the third nozzle may be more compatible to form a connection with the first nozzle. This may allow an operator to rearrange the second nozzle to be in the location of the third nozzle and the third nozzle to be in the location of the second nozzle, which may eliminate the need for the operator to physically rework the second nozzle to better connect with the first nozzle. Additionally, such rearrangement may only be possible if moving the second nozzle would also result in the second nozzle having a conforming connection with the nozzle that the third nozzle was originally attached to. That is, both of the nozzle combinations may need to result in conforming connections if a swap were to occur. At 412, it may be determined if any nozzle rearrangement possibilities may exist that would result in a conforming connection. If so, the rearrangement may be performed, assembly optimization may be subsequently conducted, and the final quality check and packaging of the physical nozzles may be undertaken. If no rearrangement possibilities exist, then at 414 the operator may be required to rework, repair or even replace the nozzle so that a conforming may be possible.

Figure 5:
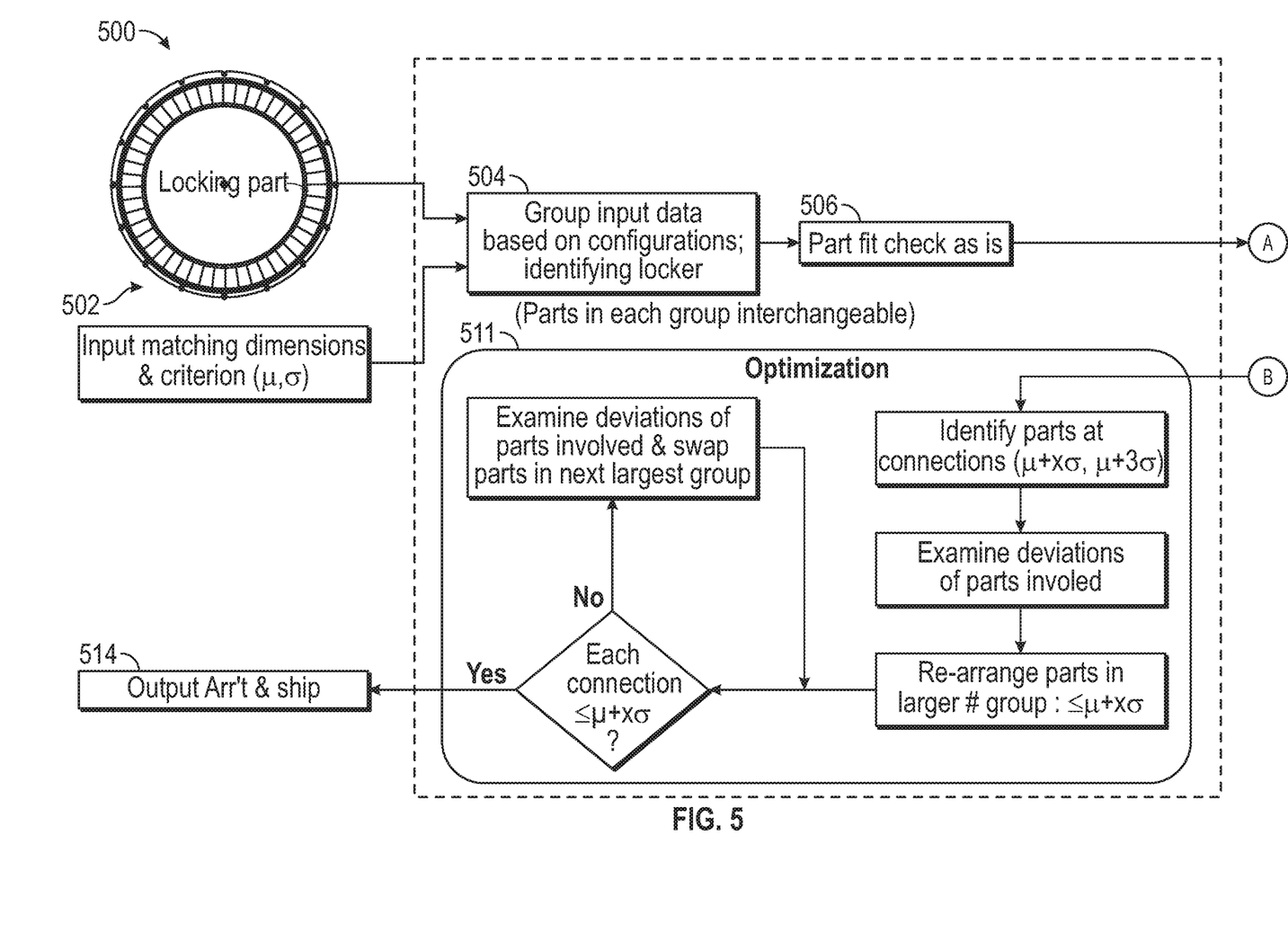
FIG. 5 depicts an example process flow according to an embodiment.

FIG. 5 depicts an example process flow 500 according to an embodiment. In some instances, the process flow 500 may provide a more detailed description of the rearrangement and optimization steps as described above with respect to FIG. 4. The process flow 500 may begin at 502 with inputs being received. In some embodiments, the inputs may include scans of the individual nozzles as described herein (for example, to create virtual representations of the nozzles). The inputs may also include information regarding individual scanned nozzles, such as configuration information for the scanned nozzles. The inputs may also include a locking part which is fixed in angular position and may not move around. The configuration information may allow for a determination as to which nozzles may be swappable based upon similar configurations. That is, nozzles may only be swapped with other nozzles of a same or similar configuration. The inputs may also include statistical information that may be used to determine nozzle connection misalignment severity (for example, a relative measure of an amount of misalignment relative to an average alignment value). The mean misalignment value may be represented as μ and a standard deviation from the mean alignment value may be represented as σ. Subsequent to receiving the inputs, scanned nozzles may be grouped based upon configuration at 504. These groupings may be used to determine which nozzles may be swappable to address potential misalignments between nozzle connections.

In some embodiments, subsequent to receiving the inputs at 502 and performing groupings at 504, fitment checks between virtual representations of nozzles may be performed at 506. In some instances, the fitment check may involve some or all of the steps as depicted in the rearrangement block 507. The rearrangement block 507 may begin at 508 with a determination as to whether each nozzle connection is conforming. A conforming connection may be a connection associated with a misalignment value representative of a level of alignment at the nozzle connection (for example, at a seal between two nozzles) that is less than or equal to a mean alignment value plus three standard deviations, i.e., μ+3σ. After determining misalignment values of nozzle connections that do not satisfy the condition described in step 508, nozzle connections that have the worst misalignment value may be identified. The worst misalignment value may include the largest misalignment value (for example, the misalignment value with the greatest number of standard deviations from the mean value). A determination may then be made as to whether the identified nozzles associated with the worst nozzle connection may be swapped with nozzles of like configuration. If so, the nozzles may be swapped at 510. Subsequently, a determination may again be made as to whether all of the nozzle connections satisfy the condition of step 508. If not, the steps of rearrangement block 507 may be iteratively performed until the condition is satisfied. If the condition is satisfied, then the process flow 500 may proceed to the optimization block at 511. Additionally, if it is determined that the condition may never be satisfied (for example, rearrangement of nozzles to satisfy the condition is not possible), then reworking, repair, or replacement of one or more of the nozzles may be required at 512.

In some embodiments, the optimization block 511 may involve further optimization of the nozzles so as to reduce the misalignment values of the nozzle connections as much as possible. The optimization block 511 may involve optimizing the results of the rearrangement block 507. For example, rearrangement block 507 may eliminate any non-conforming connections between nozzles, but the resulting connections may still be sub-optimal. Thus, the optimization block 511 may take the sub-optimal connections and provide optimal connections. A suboptimal condition may mean that there is a wide distribution of misalignments in a set of nozzles even though every connection between two adjacent nozzles is within the threshold, which implies that those nozzles with largest or close to largest misalignment are difficult to assemble. An optimal condition may mean that the distribution of the misalignment is narrowest for the set of hardware. In other words, the rearrangement block 507 may simply involve ensuring that all the nozzle connections are conforming, whereas the optimization block 511 may seek to reduce the misalignment values down to as close to the mean as possible. To accomplish this, the optimization block 511 may proceed in a manner similar to the rearrangement block in that iterations are performed to identify nozzles with the worst misalignment values, and whether those nozzles can be swapped with other nozzles of a similar configuration to result in a better misalignment value (for example a misalignment value with a lower standard deviation from the mean). These iterations may be performed until it is determined that there are no longer any possibilities for swapping nozzles to result in improved misalignment values. At this point, the locations of the nozzles in the gas turbine may be finalized at 514.

Figure 6:
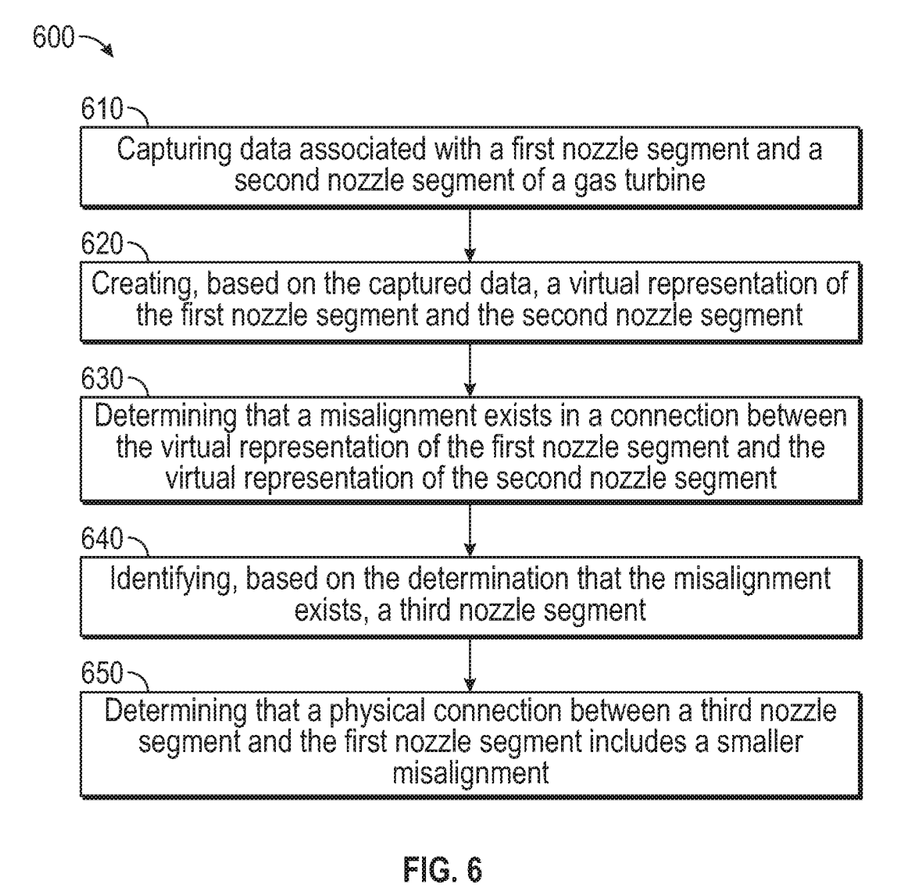
FIG. 6 depicts an example method according to an embodiment.
Figure 7:
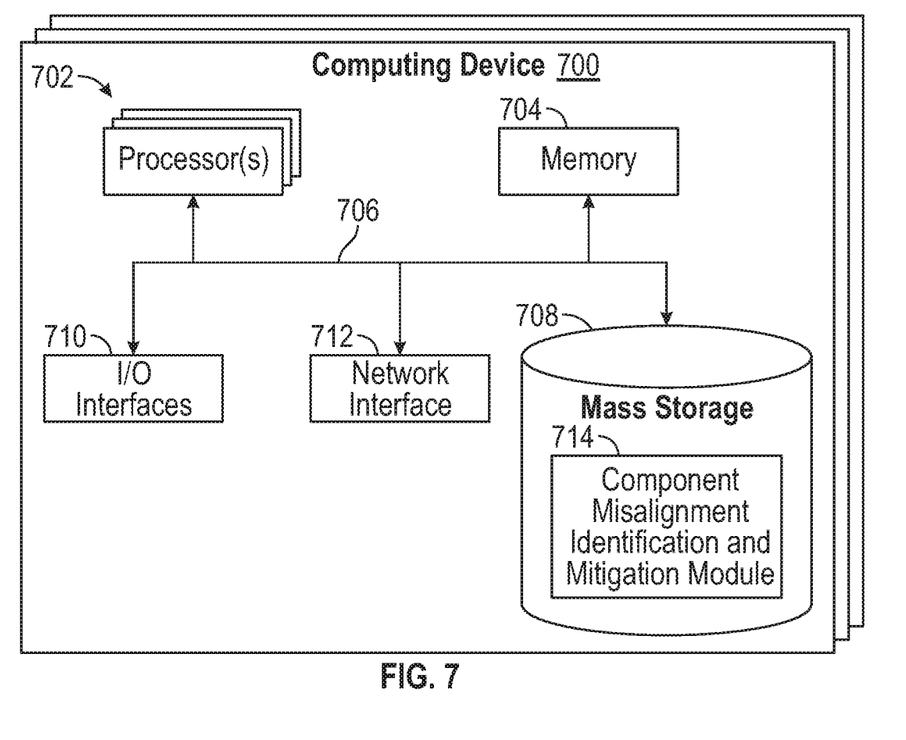
FIG. 7 depicts an illustrative system architecture according to an embodiment.

FIG. 6 is a flowchart of an example of a method, in accordance with one or more embodiments of this disclosure. A computing device (e.g., computing device 700) can implement, entirely or partially, the example method 600.

At block 610, the computing device can perform operations including capturing data associated with a first nozzle segment and a second nozzle segment of a gas turbine (reference may be made herein to a "nozzle segment," but this term may also be interchangeable with the term "nozzle" as used herein). As described above, capturing data may involve performing a scan of the nozzle segment in order to create a virtual representation of the nozzle segment. Also as described herein, the scan may be performed using a bluelight machine. In addition to scanning a first nozzle segment and a second nozzle segment, scans may also be performed for any other number of nozzle segments that may comprise a gas turbine.

At block 620, the computing device can perform operations including creating, based on the captured data, a virtual representation of the first nozzle segment and the second nozzle segment. The virtual representation of the first nozzle segment and the second nozzle segment may be used by simulation software to perform any of the remaining operations described herein. The simulation software may be the same as, for example, the component misalignment identification and mitigation modules 714 described with respect to FIG. 7 below.

At block 630, the computing device can perform operations including determining that a misalignment exists in a connection between the virtual representation of the first nozzle segment and the virtual representation of the second nozzle segment. A misalignment may include a misalignment in a seal slot between the first nozzle segment and the second nozzle segment. The misalignment may be caused, for example, by a physical deformation in the first nozzle, the second nozzle, the seal itself, or any combination of these components.

At block 640, the computing device can perform operations including identifying, based on the determination that the misalignment exists, a third nozzle segment. In some instances, the third nozzle segment may be identified as a potential candidate for swapping with either the first nozzle or second nozzle to produce a nozzle connection with an improved alignment. The third nozzle may be identified as such based on the third nozzle being of a similar configuration as the nozzle that it is being swapped with. In some instances, a nozzle configuration may refer to a nozzle that includes structurally similar features as another nozzle. The process of determining whether nozzles can be swapped with other nozzles may improve gas turbine maintenance processed by potentially eliminating the need for an operator to remove and physically rework a nozzle to produce a better alignment with another nozzle.

At block 650, the computing device can perform operations including determining that a connection between a third nozzle segment and the first nozzle segment includes a smaller misalignment. If so, the third nozzle may be swapped with the second nozzle. The third nozzle being swapped with the second nozzle, however, may also depend on a determination that the second nozzle would not result in an increase in a misalignment value with the nozzle that the third nozzle was originally connected to. In some instances, some misalignment between these nozzles may be acceptable, however, an increase in a misalignment value beyond a threshold value may result in the third nozzle not being a candidate for swapping with the second nozzle. That is, the final misalignment values of all nozzle connections after a swap still need to satisfy certain misalignment criteria.

FIG. 7 illustrates an example computing device 700, in accordance with one or more embodiments of this disclosure. The computing device 700 may include at least one processor 702 that executes instructions that are stored in one or more memory devices (referred to as memory 704). The instructions can be, for instance, instructions for implementing functionality described as being carried out by one or more modules and systems disclosed above or instructions for implementing one or more of the methods disclosed above. The processor(s) 702 can be embodied in, for example, a CPU, multiple CPUs, a GPU, multiple GPUs, a TPU, multiple TPUs, a multi-core processor, a combination thereof, and the like. In some embodiments, the processor(s) 702 can be arranged in a single processing device. In other embodiments, the processor(s) 702 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 702 can access the memory 704 by means of a communication architecture 706 (e.g., a system bus). The communication architecture 706 may be suitable for the particular arrangement (localized or distributed) and type of the processor(s) 702. In some embodiments, the communication architecture 706 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 704 also can retain data.

Each computing device 700 also can include mass storage 708 that is accessible by the processor(s) 702 by means of the communication architecture 706. The mass storage 708 can include machine-accessible instructions (e.g., computer-readable instructions and/or computer-executable instructions). In some embodiments, the machine-accessible instructions may be encoded in the mass storage 708 and can be arranged in components that can be built (e.g., linked and compiled) and retained in computer-executable form in the mass storage 708 or in one or more other machine-accessible non-transitory storage media included in the computing device 700. Such components can embody, or can constitute, one or many of the various modules disclosed herein. Such modules are illustrated as component misalignment identification and mitigation modules 714.

Execution of the component misalignment identification and mitigation modules 714, individually or in combination, by at least one of the processor(s) 702, can cause the computing device 700 to perform any of the operations described herein (for example, the operations described with respect to FIGS. 4-6, as well as any other operations).

Each computing device 700 also can include one or more input/output interface devices 710 (referred to as I/O interface 710) that can permit or otherwise facilitate external devices to communicate with the computing device 700. For instance, the I/O interface 710 may be used to receive and send data and/or instructions from and to an external computing device. The computing device 700 also includes one or more network interface devices 712 (referred to as network interface(s) 712) that can permit or otherwise facilitate functionally coupling the computing device 700 with one or more external devices. Functionally coupling the computing device 700 to an external device can include establishing a wireline connection or a wireless connection between the computing device 700 and the external device. The network interface devices 712 can include one or many antennas and a communication processing device that can permit wireless communication between a vehicle and either another vehicle or an external device. The other vehicle can be, for example, one of the vehicles included in the network 110 or an out-of-network vehicle. The external device can be, for example, one of the mobile devices included in the network 110. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A method comprising:
    capturing data associated with a first nozzle segment and a second nozzle segment of a gas turbine, including an initial set of nozzle segments;
    creating, based on the data, a virtual representation of the first nozzle segment and the second nozzle segment;
    determining that a misalignment exists in a first seal between the virtual representation of the first nozzle segment and the virtual representation of the second nozzle segment, wherein the misalignment is based on a first physical deformity in the first nozzle segment;
    determining, using the virtual representation of the first nozzle segment and the virtual representation of the second nozzle segment, that a first misalignment value associated with the first seal between the first nozzle segment and the second nozzle segment are both greater than a sum of a mean misalignment value and a number of standard deviations from the mean misalignment value;
    identifying, based on the determination that the first misalignment exists value is greater than the sum of a mean misalignment value and the number of standard deviations from the mean misalignment value, a third nozzle segment, wherein the third nozzle segment includes a second physical deformity; and determining that a second seal formed between the second physical deformity of the third nozzle segment and the first physical deformity of the first nozzle segment results in a second misalignment value that is less than the sum of the mean misalignment value and the number of standard deviations from the mean misalignment value; and providing an indication to rearrange the second nozzle segment and the third nozzle segment;

determining that misalignment values associated with all remaining combinations between a fourth nozzle segment and another nozzle segment in the gas turbine are greater than the sum of the mean misalignment value and the number of standard deviations from the mean misalignment value; and proving an indication to repair the fourth nozzle segment instead of rearranging the fourth nozzle segment with another nozzle segment included in the initial set of nozzle segments.

2. The method of claim 1, wherein determining that a misalignment exists in a connection between the virtual representation of the first nozzle segment and the virtual representation of the second nozzle segment further comprises determining that a connecting portion of the first nozzle segment, second nozzle or both are deformed.

3. The method of claim 1, wherein determining that the misalignment exists in the first seal between the virtual representation of the first nozzle segment and the virtual representation of the second nozzle segment further comprises the virtual representation of the first nozzle segment to a model of a nozzle segment that is absent of any physical deformities.

4. The method of claim 1, wherein a seal element that forms the first seal between the first nozzle segment and the second nozzle segment.

5. The method of claim 1, wherein the second nozzle segment includes a second structural configuration, and wherein identifying the third nozzle segment is based on the third nozzle segment also including a same structural configuration as the second nozzle segment.

6. The method of claim 1, wherein the data associated with the first nozzle segment is captured using a bluelight scanbox or a coordinate-measuring machine (CMM).

7. A system comprising:
a processor; and
a memory storing computer-executable instructions, that when executed by the processor, cause the processor to:
capture data associated with a first nozzle segment and a second nozzle segment of a gas turbine including an initial set of nozzle segments;
create, based on the data, a virtual representation of the first nozzle segment and the second nozzle segment;
determine that a misalignment exists in a connection between the virtual representation of the first nozzle segment and the virtual representation of the second nozzle segment;
determine, using the virtual representation of the first nozzle segment and the virtual representation of the second nozzle segment, that a first misalignment value of the first nozzle segment and a second misalignment value of the second nozzle segment are both greater than a sum of a mean misalignment value and a number of standard deviations from the mean misalignment value;
identify, based on the misalignment, a third nozzle segment of a same configuration as the second nozzle segment;

determine that a connection between a third nozzle segment and the first nozzle segment results in a third misalignment value that is less than the sum of the mean misalignment value and the number of standard deviations from the mean misalignment value;
provide an indication to rearrange the second nozzle segment and the third nozzle segment;
determine that misalignment values associated with all remaining combinations between a fourth nozzle segment and another nozzle segment in the gas turbine are greater than the sum of the mean misalignment value and the number of standard deviations from the mean misalignment value; and
provide an indication to repair the fourth nozzle segment instead of rearranging the fourth nozzle segment with another nozzle segment included in the initial set of nozzle segments.

8. The system of claim 7, wherein determining that a misalignment exists in a connection between the virtual representation of the first nozzle segment and the virtual representation of the second nozzle segment further comprises determining that a connecting portion of the first nozzle segment is deformed.

9. The system of claim 7, wherein determining that the misalignment exists in the connection between the virtual representation of the first nozzle segment and the virtual representation of the second nozzle segment further comprises the virtual representation of the first nozzle segment to a model of a nozzle segment that is absent of any physical deformities.

10. The system of claim 7, wherein the connection includes a seal element that forms a seal between the first nozzle segment and the second nozzle segment.

11. The system of claim 7, wherein identifying the third nozzle segment is based on the third nozzle segment also including a same structural configuration as the second nozzle segment.

12. The system of claim 7, wherein the data associated with the first nozzle segment is captured using a bluelight scanbox or a coordinate-measuring machine (CMM).

13. A non-transitory computer-readable medium storing computer-executable instructions which when executed by one or more processors result in performing operations comprising:
capturing data associated with a first nozzle segment and a second nozzle segment of a gas turbine including an initial set of nozzle segments;
creating, based on the data, a virtual representation of the first nozzle segment and the second nozzle segment;
determining that a misalignment exists in a connection between the virtual representation of the first nozzle segment and the virtual representation of the second nozzle segment;
determining, using the virtual representation of the first nozzle segment and the virtual representation of the second nozzle segment, that a first misalignment value of the first nozzle segment and a second misalignment value of the second nozzle segment are both greater than a sum of a mean misalignment value and a number of standard deviations from the mean misalignment value;
identifying, based on the determination that the misalignment exists, a third nozzle segment;
determining that a connection between a third nozzle segment and the first nozzle segment results in a third misalignment value that is less than the sum of the mean misalignment value and the number of standard deviations from the mean misalignment value;

providing an indication to rearrange the second nozzle segment and the third nozzle segment;

determining that misalignment values associated with all remaining combinations between a fourth nozzle segment and another nozzle segment in the gas turbine are greater than the sum of the mean misalignment value and the number of standard deviations from the mean misalignment value; and proving an indication to repair the fourth nozzle segment instead of rearranging the fourth nozzle segment with another nozzle segment included in the initial set of nozzle segments.

14. The non-transitory computer-readable medium of claim 13, wherein determining that a misalignment exists in a connection between the virtual representation of the first nozzle segment and the virtual representation of the second nozzle segment further comprises determining that a connecting portion of the first nozzle segment is deformed.

15. The non-transitory computer-readable medium of claim 13, wherein determining that the misalignment exists in the connection between the virtual representation of the first nozzle segment and the virtual representation of the second nozzle segment further comprises the virtual representation of the first nozzle segment to a model of a nozzle segment that is absent of any physical deformities.

16. The non-transitory computer-readable medium of claim 13, wherein the connection includes a seal element that forms a seal between the first nozzle segment and the second nozzle segment.

17. The non-transitory computer-readable medium of claim 13, wherein identifying the third nozzle segment is based on the third nozzle segment also including a same structural configuration as the second nozzle segment.

\* \* \* \* \*